(12) United States Patent
Yamaguchi et al.

(10) Patent No.: US 10,663,139 B2
(45) Date of Patent: May 26, 2020

(54) VEHICULAR LAMP

(71) Applicants: KOITO MANUFACTURING CO., LTD., Tokyo (JP); HONDA MOTOR CO., LTD., Tokyo (JP)

(72) Inventors: Masaya Yamaguchi, Shizuoka (JP); Yuji Yasuda, Shizuoka (JP); Naoki Urushibata, Shizuoka (JP); Akira Hongo, Wako (JP); Ryou Chijimatsu, Wako (JP); Hidefumi Watanabe, Wako (JP); Hiroshi Iimori, Wako (JP); Shinichi Todaka, Wako (JP)

(73) Assignees: KOITO MANUFACTURING CO., LTD., Tokyo (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/759,684

(22) PCT Filed: Sep. 13, 2016

(86) PCT No.: PCT/JP2016/077016
§ 371 (c)(1),
(2) Date: Mar. 13, 2018

(87) PCT Pub. No.: WO2017/047598
PCT Pub. Date: Mar. 23, 2017

(65) Prior Publication Data
US 2019/0041024 A1    Feb. 7, 2019

Related U.S. Application Data

(63) Continuation of application No. PCT/JP2016/077016, filed on Sep. 13, 2016.

(30) Foreign Application Priority Data

Sep. 14, 2015  (JP) ................. 2015-180734
Sep. 14, 2015  (JP) ................. 2015-180735
Sep. 14, 2015  (JP) ................. 2015-180736

(51) Int. Cl.
*F21S 45/47* (2018.01)
*F21S 41/19* (2018.01)
(Continued)

(52) U.S. Cl.
CPC ............ *F21S 45/47* (2018.01); *B60Q 1/0058* (2013.01); *F21S 41/141* (2018.01); *F21S 41/147* (2018.01);
(Continued)

(58) Field of Classification Search
CPC ........ F21S 45/47; F21S 41/141; F21S 47/285; F21S 47/40; F21S 47/32; F21S 43/14; F21S 43/26; F21S 43/31; F21W 2103/20
See application file for complete search history.

(56) References Cited

U.S. PATENT DOCUMENTS

2006/0196643 A1    9/2006 Hata et al.
2011/0063868 A1*   3/2011 Tsukamoto ........... F21S 41/147
                                                          362/539

(Continued)

FOREIGN PATENT DOCUMENTS

JP           6-3644 U      1/1994
JP       2001-35212 A      2/2001
(Continued)

OTHER PUBLICATIONS

Notification of Reasons for Refusal issued in Japanese Application No. 2015-180734, dated Aug. 21, 2018 (12 pages).
(Continued)

*Primary Examiner* — David V Bruce
(74) *Attorney, Agent, or Firm* — Osha Liang LLP (57) ABSTRACT

A vehicle lamp (1) includes a light emitting element (26, 56) functioning as a light source, a substrate (8, 11) on which the
(Continued)

light emitting element is mounted, at least the portion of the substrate on which the light emitting element is mounted being colored in a dark color, a reflection part (14, 44) configured to reflect light emitted from the light emitting element, and a concealing part (13, 43) configured to hold the substrate and conceal at least a part of the substrate. A first diffusion portion (22, 52) configured to diffuse light is formed in at least a part of a region of the concealing part facing the reflection part.

16 Claims, 8 Drawing Sheets

(51) Int. Cl.
    *F21S 41/43*       (2018.01)
    *F21S 41/151*     (2018.01)
    *F21S 41/147*     (2018.01)
    *F21S 41/39*       (2018.01)
    *B60Q 1/00*       (2006.01)
    *F21S 41/32*       (2018.01)
    *F21S 43/14*       (2018.01)
    *F21S 45/49*       (2018.01)
    *F21S 43/31*       (2018.01)
    *F21S 41/141*     (2018.01)
    *F21S 41/40*       (2018.01)
    *F21S 41/20*       (2018.01)
    *F21S 43/20*       (2018.01)
    *F21W 102/13*     (2018.01)
    *F21W 103/20*     (2018.01)

(52) U.S. Cl.
CPC ............ *F21S 41/151* (2018.01); *F21S 41/19* (2018.01); *F21S 41/192* (2018.01); *F21S 41/285* (2018.01); *F21S 41/32* (2018.01); *F21S 41/321* (2018.01); *F21S 41/39* (2018.01); *F21S 41/40* (2018.01); *F21S 41/43* (2018.01); *F21S 43/14* (2018.01); *F21S 43/26* (2018.01); *F21S 43/31* (2018.01); *F21S 45/49* (2018.01); *F21W 2102/13* (2018.01); *F21W 2103/20* (2018.01)

(56) References Cited

U.S. PATENT DOCUMENTS

| | | | |
|---|---|---|---|
| 2015/0062948 A1* | 3/2015 | Otsubo | .................. F21S 41/19 362/518 |
| 2016/0010843 A1 | 1/2016 | Hattori et al. | |

FOREIGN PATENT DOCUMENTS

| | | | | |
|---|---|---|---|---|
| JP | 2003-249103 A | | 9/2003 | |
| JP | 2004-265697 A | | 9/2004 | |
| JP | 2006-242479 A | | 9/2006 | |
| JP | 2006-294263 A | | 10/2006 | |
| JP | 2010-182486 A | | 8/2010 | |
| JP | 2011-65808 A | | 3/2011 | |
| JP | 2012-033413 A | | 2/2012 | |
| JP | 2012033413 A | * | 2/2012 | ............ F21S 41/143 |
| JP | 2012-216348 A | | 11/2012 | |
| JP | 2014-165150 A | | 9/2014 | |
| JP | 2014-209502 A | | 11/2014 | |
| JP | 2015-50173 A | | 3/2015 | |
| JP | 2015-156324 A | | 8/2015 | |

OTHER PUBLICATIONS

Notification of Reasons for Refusal issued in Japanese Application No. 2015-180736, dated Aug. 21, 2018 (11 pages).
Search Report dated Dec. 6, 2016, issued by the International Searching Authority in counterpart International Patent Application No. PCT/JP2016/077016 (PCT/ISA/210).
Written Opinion dated Dec. 6, 2016, issued by the International Searching Authority in counterpart International Patent Application No. PCT/JP2016/077016 (PCT/ISA/237).
Notification of Reasons fo Refusal issued in Japanese Application No. 2015-180734, dated Apr. 2, 2019 (15 pages).

* cited by examiner

VEHICULAR LAMP

TECHNICAL FIELD

The disclosure relates to a vehicle lamp.

BACKGROUND ART

For example, there is a type of a vehicle lamp in which a substrate on which a light emitting element functioning as a light source is mounted is disposed inside a lamp outer casing configured by a cover and a lamp housing, and light emitted from the light emitting element is reflected by a reflection part such as a reflector and irradiated to the outside.

In such a vehicle lamp, when a light emitting element is turned off, the color of a predetermined member is projected on a reflection part of a reflector, and thus, the vehicle lamp can be seen in different colors at the time of the turning on and off, respectively (e.g., see Patent Document 1).

The vehicle lamp disclosed in Patent Document 1 is configured such that an extension configured to shield a part of the structure disposed inside a lamp outer casing is colored in black and the color of the extension is projected on a reflection part at the time of the turning off.

Further, for example, there is a vehicle lamp in which a substrate on which a light emitting element functioning as a light source is mounted is disposed inside a lamp outer casing configured by a cover and a lamp housing, and heat generated when the light emitting element is turned on is discharged by a heat-dissipation member such as a heat-dissipation plate (e.g., see Patent Document 2).

In the vehicle lamp disclosed in Patent Document 2, a heat sink is used as the heat-dissipation member, a conductive film is formed on a surface of a substrate on which a light emitting element is mounted, an insulation film having heat conductivity is formed on the conductive film, and the heat sink is in contact with the insulation film to discharge the generated heat from the heat sink. Therefore, the conductive film and the insulation film function as a heat transfer portion for transferring heat from the substrate as a heat generation source to the heat-dissipation member.

CITATION LIST

Patent Document

Patent Document 1: Japanese Patent Laid-Open Publication No. 2004-265697

Patent Document 2: Japanese Patent Laid-Open Publication No. 2010-182486

SUMMARY OF INVENTION

Problems to be Solved

In the vehicle lamp including the reflection part for reflecting light as described above, dazzling light may occur to a passenger of an oncoming vehicle or a preceding vehicle when light emitted from the light emitting element at the time of the turning on is reflected in unnecessary portions.

On the other hand, when sunlight is incident on the inside of the lamp outer casing at the time of the turning off, the incident light is reflected and dazzling light may occur to a passenger of other vehicle or a pedestrian or the like.

Furthermore, in the configuration in which a heat transfer portion is provided between the substrate and the heat-dissipation member as described above, it is necessary to secure a high positional accuracy between the heat-dissipation member and the substrate in consideration of the thickness of the heat transfer portion. That is, in the vehicle lamp disclosed in Patent Document 2, in consideration of the thickness of the conductive film and the insulation film which function as the heat transfer portion, it is necessary to secure a high positional accuracy of the heat sink as the heat-dissipation member to the substrate and it is necessary to secure a good contact state of the heat sink to the insulation film.

However, in the vehicle lamp disclosed in Patent Document 2, the substrate and the heat-dissipation member are fastened by a bolt and a nut with the heat transfer portion interposed therebetween, so that the heat-dissipation member is in contact with the heat transfer portion. The contact state of the heat-dissipation member to the heat transfer portion depends on the fastening state of the bolt and the nut.

Therefore, the close contact state of the heat-dissipation member to the heat transfer portion changes depending on the degree of tightening of the bolt to the nut by an operator. Thus, for example, when the degree of tightening is weak, a good close contact state of the heat-dissipation member to the heat transfer portion cannot be secured and there is a possibility that a sufficient heat-dissipation performance cannot be obtained.

Furthermore, in the configuration in which heat generated when the light emitting element is turned on is discharged by the heat-dissipation member as described above, it is necessary to secure a good lighting state of the light emitting element by improving the heat-dissipation performance and sufficiently suppressing the temperature rise of the substrate or the like.

Further, in the vehicle lamp, it is necessary to sufficiently conceal a part of the internal structure disposed inside the lamp outer casing. However, it is preferable that such concealing is performed without increasing the cost.

From the foregoing, a first object of the disclosure is to suppress the occurrence of dazzling light at the time of the turning on and off. Further, a second object of the disclosure is to secure a high positional accuracy of the heat-dissipation plate to the substrate and improve the heat-dissipation performance. Furthermore, a third object of the disclosure is to improve the heat-dissipation for heat generated when the light emitting element is turned on and to sufficiently conceal a part of the internal structure without increasing the cost.

Means for Solving the Problems

According to a first aspect, there is provided a vehicle lamp which includes a light emitting element functioning as a light source;

a substrate on which the light emitting element is mounted, at least the portion of the substrate on which the light emitting element is mounted being colored in a dark color, a reflection part configured to reflect light emitted from the light emitting element, and a concealing part configured to hold the substrate and conceal at least a part of the substrate, in which a first diffusion portion configured to diffuse light is formed in at least a part of a region of the concealing part facing the reflection part.

According to the above configuration, at the time of the turning on, a part of light emitted from the light emitting element is diffused by the first diffusion portion. Further, at the time of the turning off, a dark color of the substrate is projected on the reflection part, and sunlight is diffused by the first diffusion portion when sunlight is incident. In this manner, it is possible to suppress the occurrence of dazzling light at the time of the turning on and off.

According to a second aspect, there is provided a vehicle lamp which includes a substrate having a first surface and a second surface facing in a direction opposite to the first surface, a light emitting element mounted on the first surface of the substrate, a base part facing the first surface of the substrate and configured to hold the substrate, a heat-dissipation plate configured to discharge heat generated from the light emitting element, and a heat transfer sheet in contact with the second surface of the substrate and the heat-dissipation plate, in which a positioning protrusion is provided in the base part, and in which the positioning protrusion has a first positioning portion configured to position the substrate in a thickness direction of the substrate, and a second positioning portion configured to position the heat-dissipation plate in a thickness direction of the heat-dissipation plate.

According to the above configuration, since the substrate is positioned in the thickness direction of the substrate and the heat-dissipation plate is positioned in the thickness direction of the heat-dissipation plate by the first positioning portion and the second positioning portion, a high positional accuracy of the heat-dissipation plate to the substrate is secured and a good contact state of the heat-dissipation plate and the substrate to the heat transfer sheet is secured. In this manner, it is possible to improve the heat-dissipation performance of the vehicle lamp.

According to a third aspect, there is provided a vehicle lamp which includes a lamp unit.

The lamp unit includes a light emitting element, a substrate on which the light emitting element is mounted, a heat-dissipation plate having a discharge surface configured to discharge heat, a reflection part configured to reflect light emitted from the light emitting element, and a base part configured to hold the substrate and the heat-dissipation plate in a state of being adjacent to or in close contact with each other, in which a protruding portion protruding forward of the vehicle lamp than the base part is provided on the heat-dissipation plate.

According to the above configuration, since the area of the heat-dissipation plate is increased by the presence of the protruding portion and a part of the structure is shielded by the protruding portion, it is possible to improve the heat-dissipation for heat generated when the light emitting element is turned on and it is possible to sufficiently conceal a part of the internal structure without increasing the cost.

BRIEF DESCRIPTION OF DRAWINGS

FIG. 1 shows an embodiment of a vehicle lamp of the disclosure together with FIGS. 2 to 8.

DETAILED DESCRIPTION OF EMBODIMENTS

Hereinafter, an embodiment for carrying out a vehicle lamp of the disclosure will be described with reference to the accompanying drawings.

In an embodiment described below, a vehicle lamp of the disclosure is applied to a combination lamp having functions of a headlamp and a turn signal lamp. Here, the scope of application of the disclosure is not limited to a combination lamp having functions of a headlamp and a turn signal lamp. The disclosure can be widely applied to various vehicle lamps such as a headlamp, a clearance lamp, a tail lamp, a turn signal lamp, a stop lamp, a daytime running lamp, a cornering lamp, a hazard lamp, a position lamp, a back lamp, a fog lamp, etc., or a combination lamp thereof.

A vehicle lamp 1 is disposed and attached to both left and right end portions in a front end portion of a vehicle body, respectively.

Figure 1:
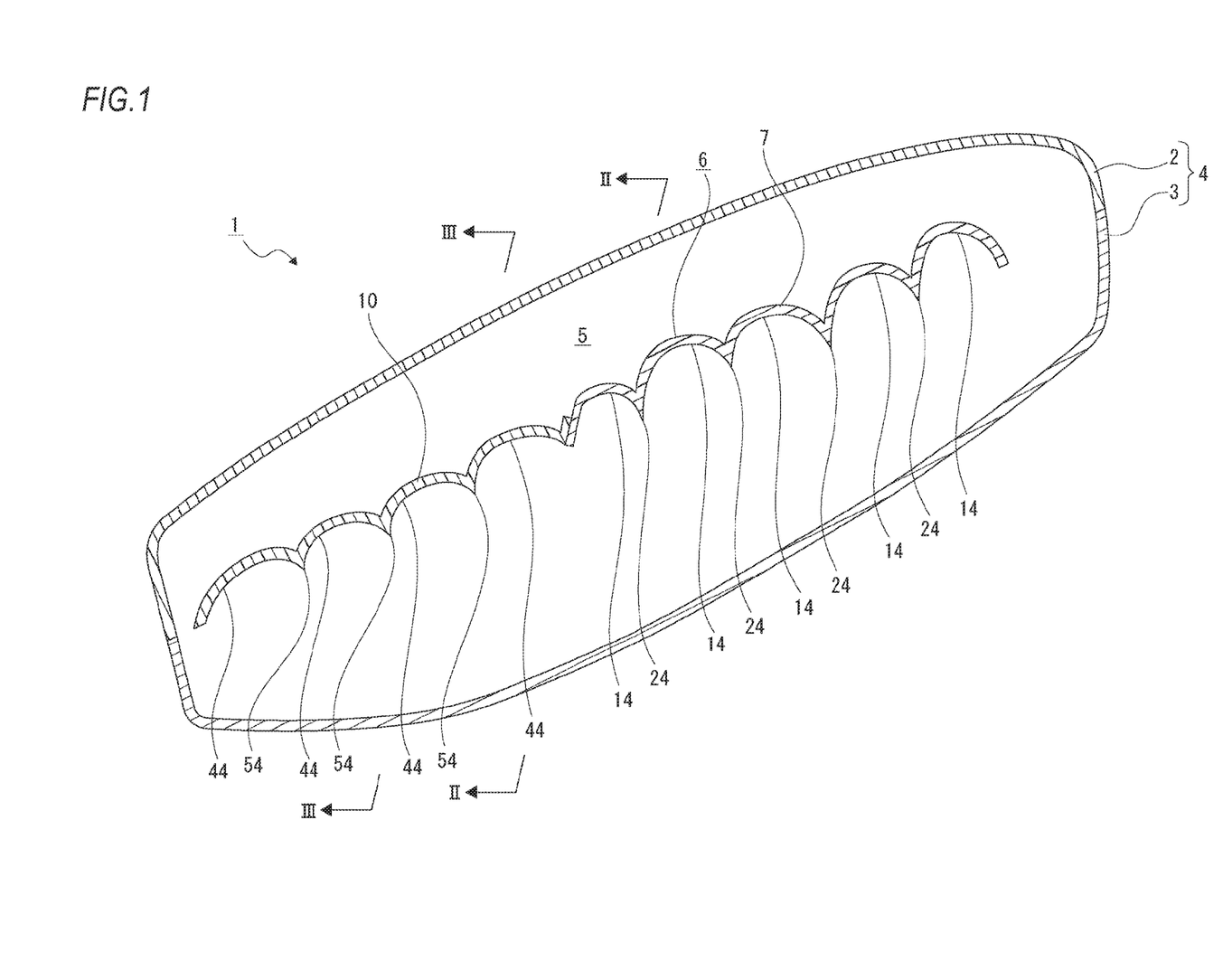
FIG. 1 is a schematic horizontal sectional view of the vehicle lamp.
Figure 2:
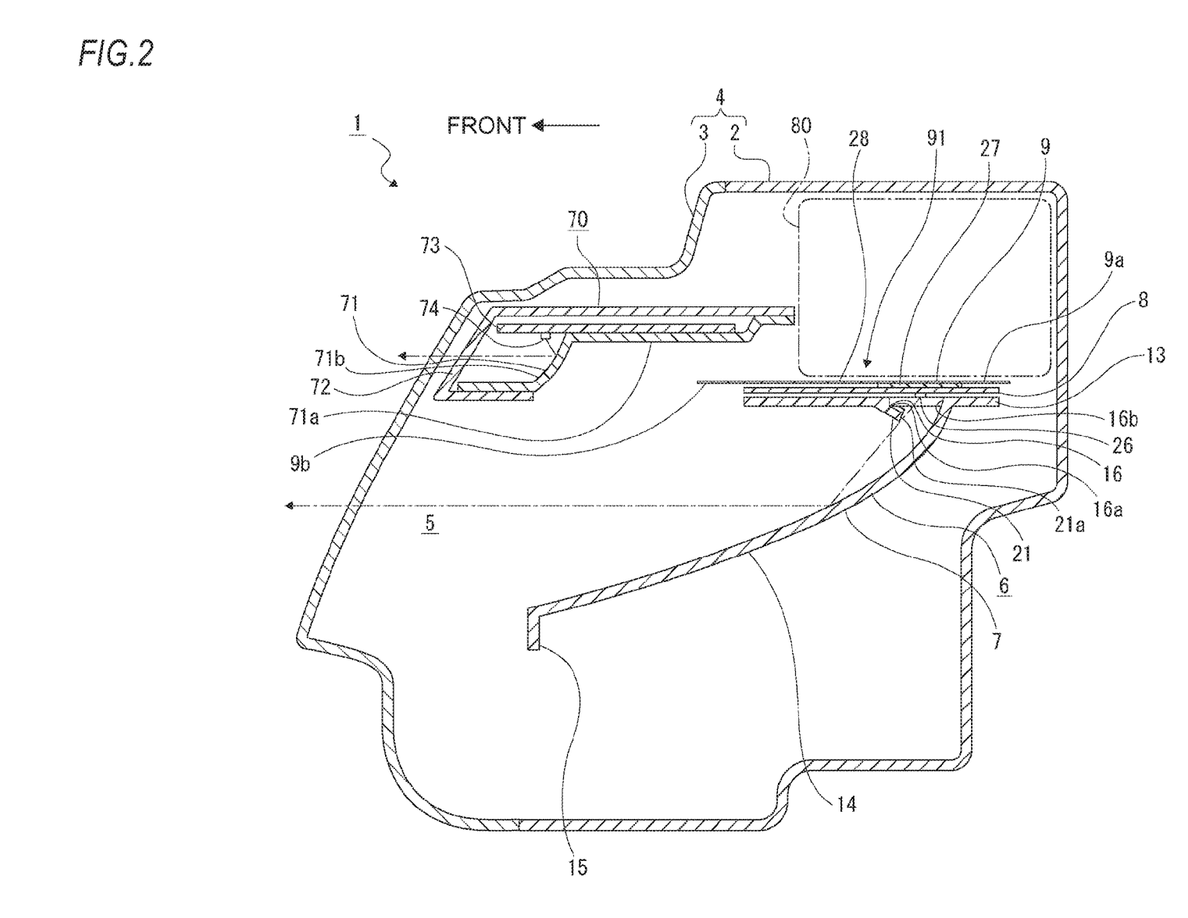
FIG. 2 is a sectional view taken along the line II-II in FIG. 1.
Figure 3:
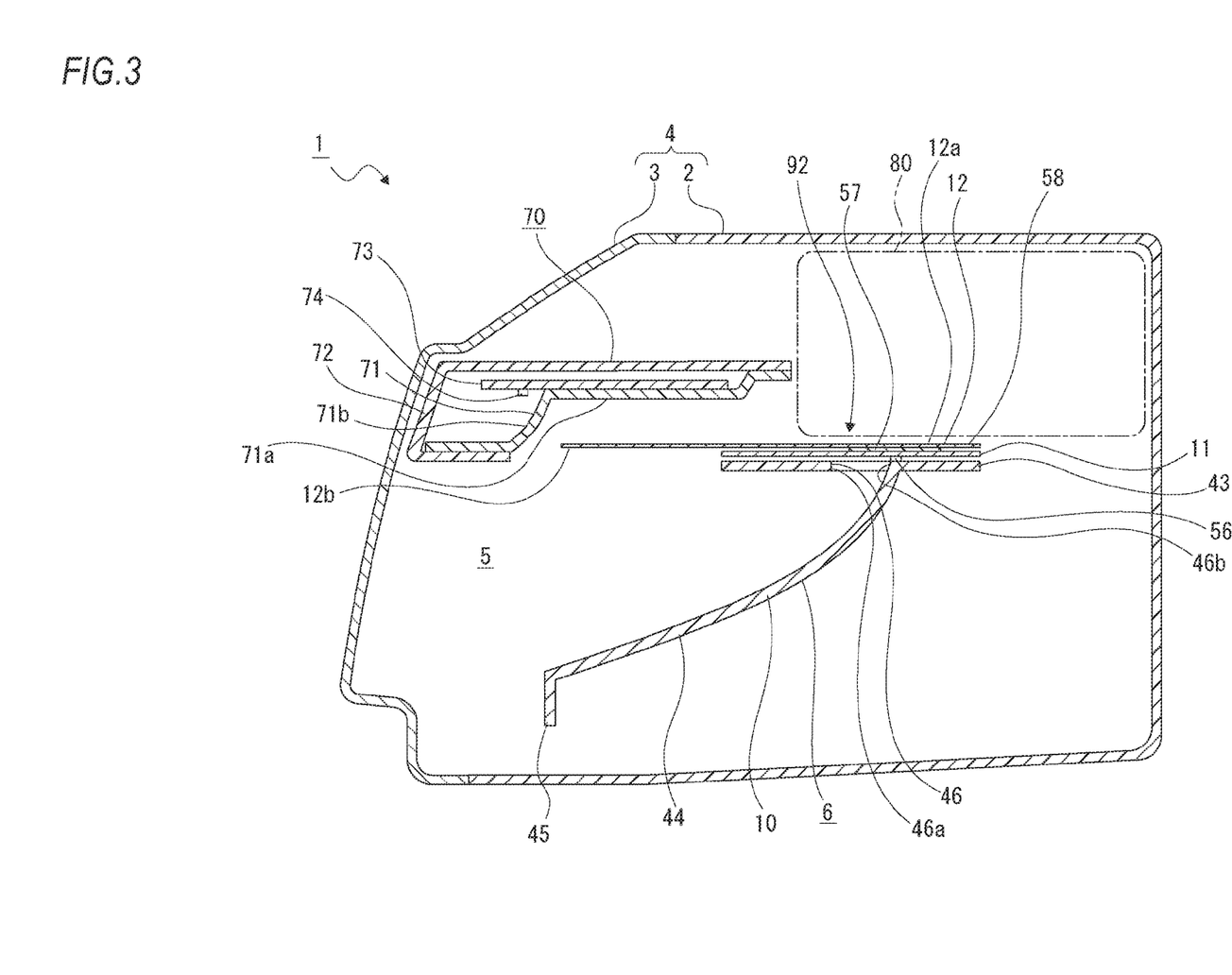
FIG. 3 is a sectional view taken along the line III-III in FIG. 1.

The vehicle lamp 1 has a laterally long shape as a whole and includes a lamp housing 2 having an opening at the front and a cover 3 closing the opening of the lamp housing 2 (see FIGS. 1 to 3). A lamp outer casing 4 is configured by the lamp housing 2 and the cover 3, and an internal space of the lamp outer casing 4 is formed as a lamp chamber 5.

A lamp unit 6 is disposed in the lamp chamber 5. The lamp unit 6 functions as a headlamp and includes a first reflector 7, a first substrate 8, a first heat-dissipation plate 9, a second reflector 10, a second substrate 11, and a second heat-dissipation plate 12 (see FIGS. 4 and 5).

A first irradiation module 91 and a second irradiation module 92 are provided in the lamp unit 6. The first irradiation module 91 includes the first reflector 7, the first substrate 8, and the first heat-dissipation plate 9, and the second irradiation module 92 includes the second reflector 10, the second substrate 11, and the second heat-dissipation plate 12. When light is emitted from the first irradiation module 91, a low beam is irradiated. When light is simultaneously emitted from the first irradiation module 91 and the second irradiation module 92, a high beam is irradiated.

The first reflector 7 is positioned on the outside of a vehicle with respect to the second reflector 10, and respective parts thereof are integrally formed. The first reflector 7 includes a base part 13 formed in a plate shape and oriented in an upper and lower direction, reflection parts 14, 14, . . . configured to reflect light, and an outer edge part 15, one end portion of which is continuous to one end portion of the base part 13.

Figure 6:
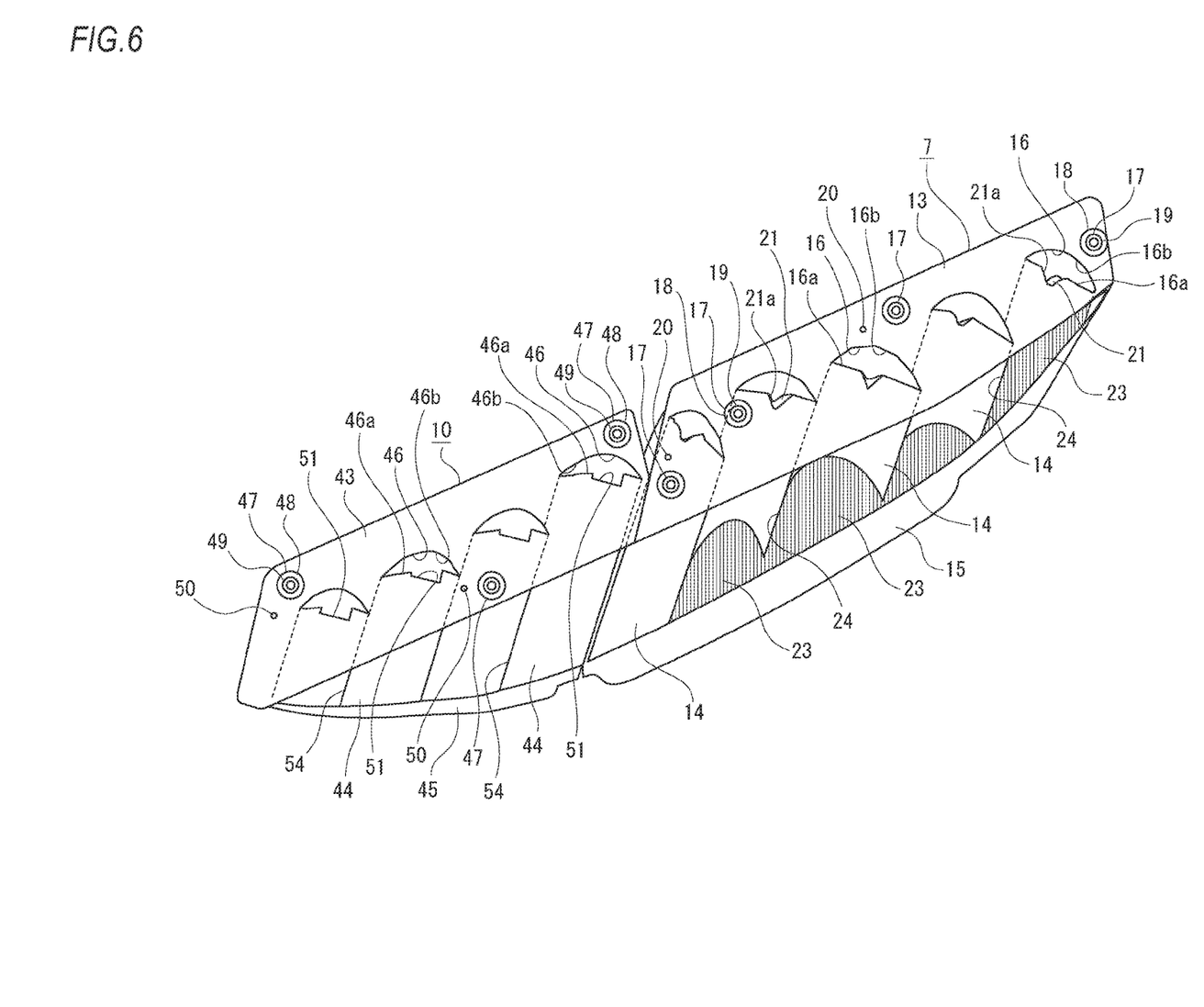
FIG. 6 is a plan view of a reflector.

The base part 13 has a laterally long shape. Light transmitting holes 16, 16, . . . are formed at a rear end portion of the base part 13 so as to be separated from each other in a left and right direction (see FIGS. 4 and 6). The light transmitting hole 16 has a laterally long shape, and an opening edge thereof has a front opening edge 16a formed in a substantially linear shape and a rear opening edge 16b formed in a gently curved shape convex backward. In the light transmitting hole 16, both left and tight ends of the front opening edge 16a are aligned with both left and right ends of the rear opening edge 16b, respectively.

Figure 4:
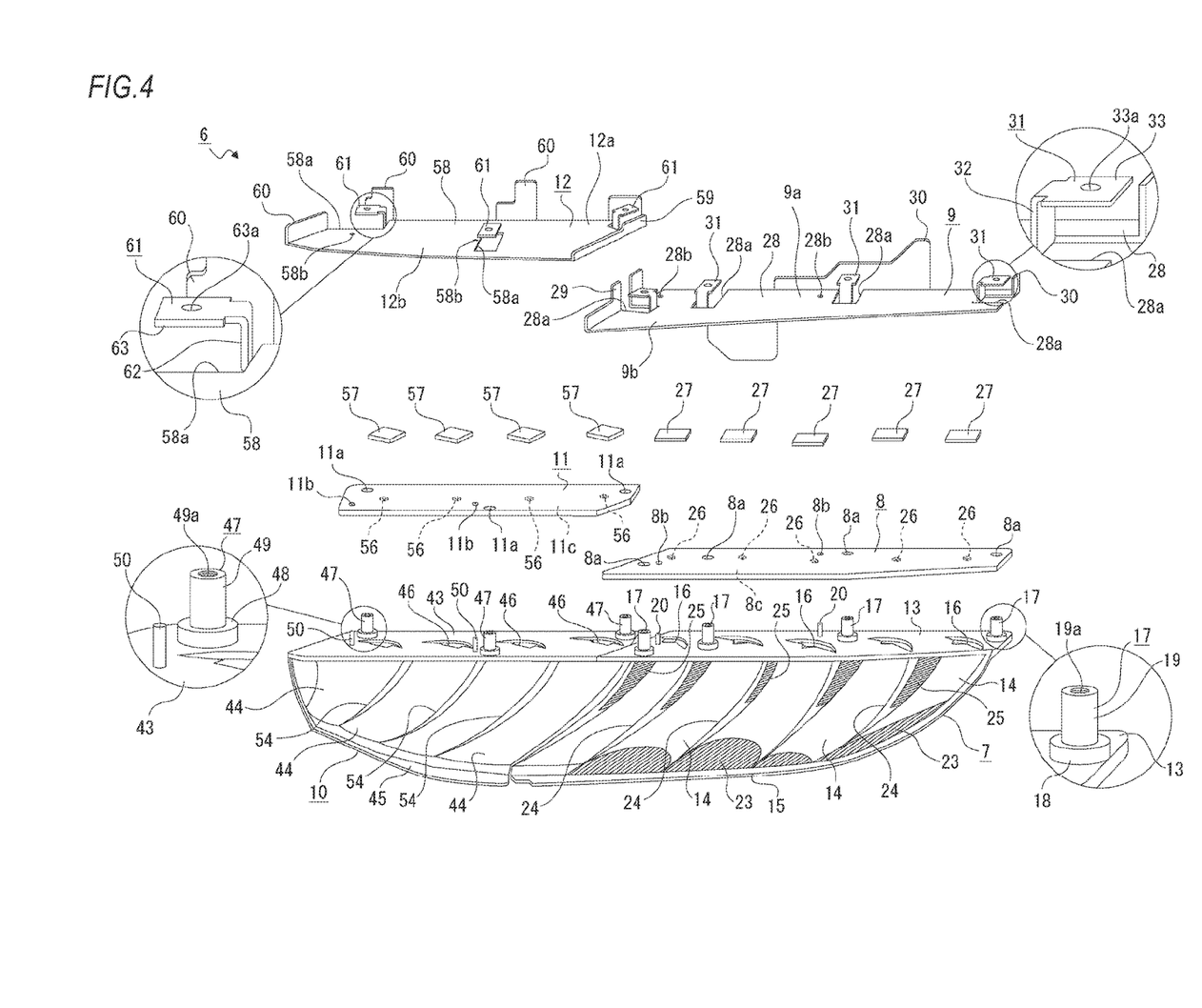
FIG. 4 is an exploded perspective view of the vehicle lamp.
Figure 7:
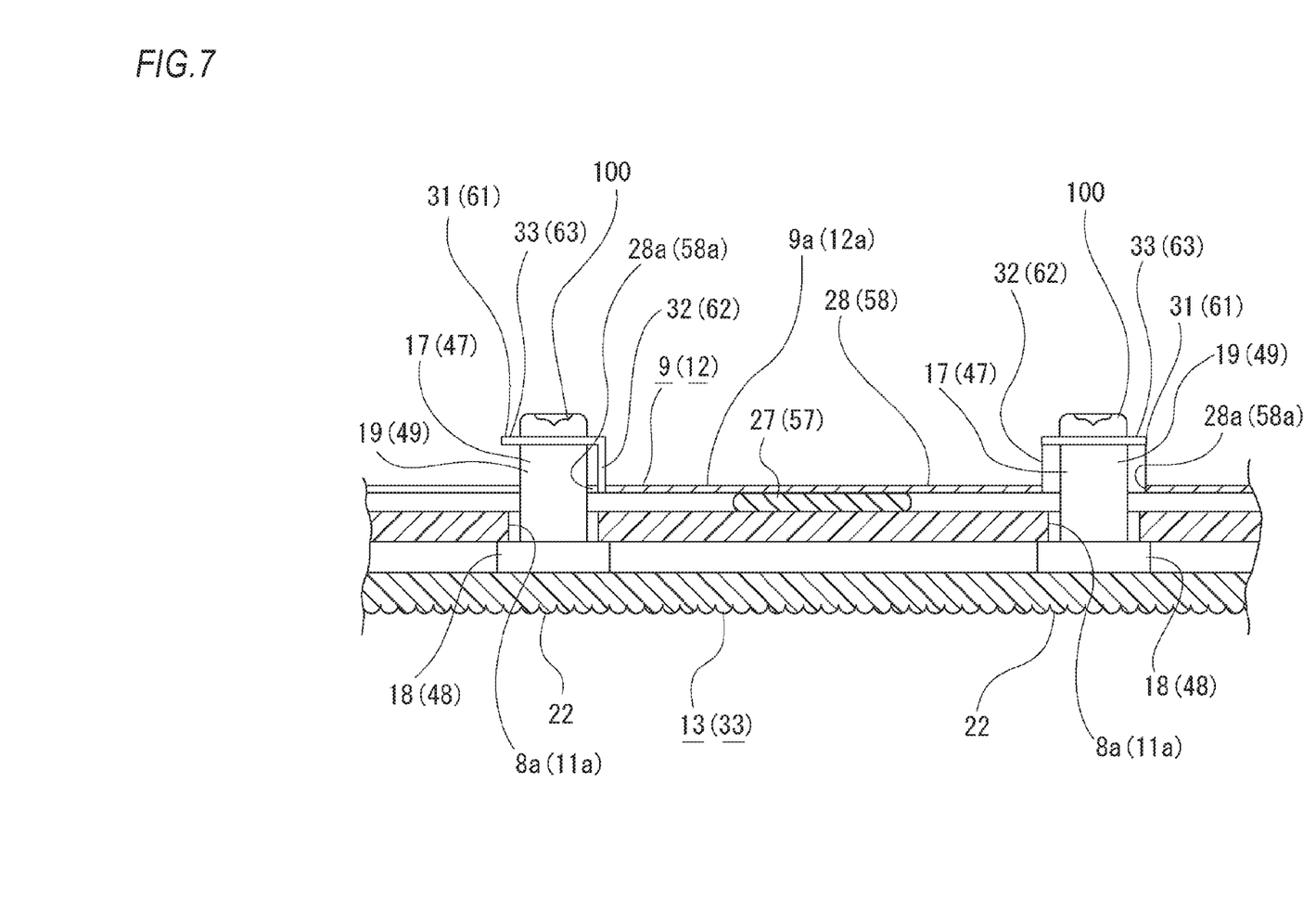
FIG. 7 is a sectional view showing a state in which a substrate and a heat-dissipation plate are positioned by positioning protrusions.

Positioning protrusions 17, 17, . . . protruding upward are provided on the base part 13 (see FIGS. 4 and 7). The positioning protrusion 17 has a first positioning portion 18 having a large diameter and a second positioning portion 19 having a small diameter. The first positioning portion 18 has a flange shape protruding outward from a lower end portion of the second positioning portion 19, and the second positioning portion 19 has a round shaft shape extending in the upper and lower direction. A screw hole 19a opening upward is formed in the second positioning portion 19.

Positioning pins 20, 20 protruding upward are provided on the base part 13 so as to be separated from each other in the left and right direction.

Figure 8:
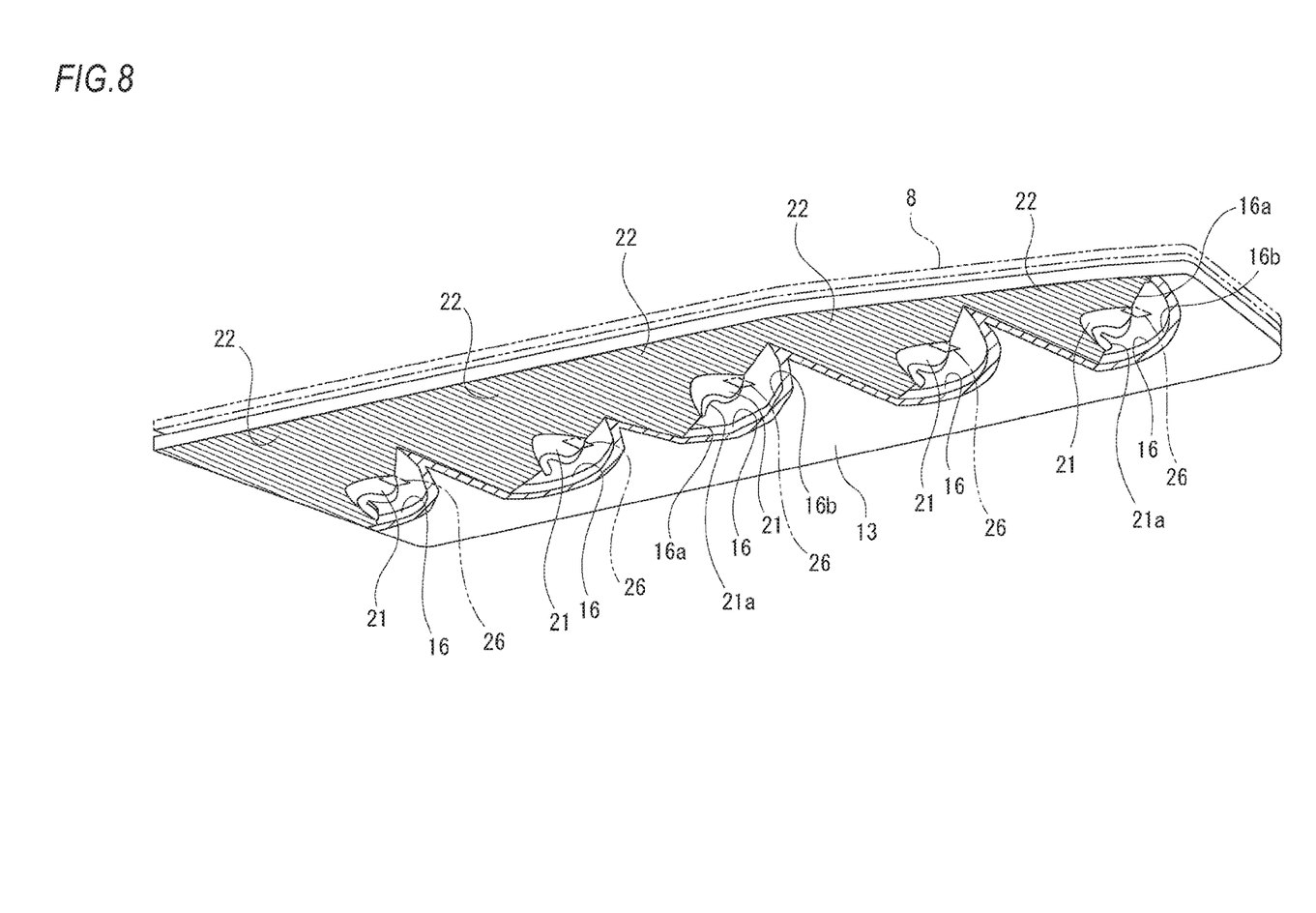
FIG. 8 is a perspective view showing a part of a first reflector.

Light-shielding portions 21, 21, . . . protruding downward are provided on the base part 13 so as to be separated from each other in the left and right direction (see FIG. 8). The light-shielding portion 21 is formed continuously with the front opening edge 16a of the light transmitting hole 16, and is continuous with the center portion of the front opening edge 16a in the left and right direction. The light-shielding portion 21 is provided with a substantially V-shaped notch 21a opening rearward.

On the portions of the lower surface of the base part 13 excluding the light-shielding portions 21, 21, . . ., first diffusion portions 22, 22, . . . are formed side by side in the left and right direction. The first diffusion portions 22, 22, . . . are formed at least partially in regions facing the reflection parts 14, 14, . . . . The first diffusion portion 22 is, for example, a plurality of cylindrical steps arranged side by side in the left and right direction. Here, the first diffusion portion 22 is not limited to the cylindrical steps, but may be a convex-concave shape or the like formed by embossing or knurling.

The reflection parts 14, 14, . . . are positioned side by side in the left and right direction and provided continuously with the rear opening edges 16b, 16b, . . . of the light transmitting holes 16, 16, . . ., respectively (see FIGS. 2 and 4). The reflection part 14 has an upper edge aligned with the rear opening edge 16b and is inclined so as to be displaced forward as going downward.

The outer edge part 15 is provided to extend from the front position of the reflection parts 14, 14, . . . toward the outer end edge of the base part 13, and has a strip-like shape having a small width in the front and rear direction.

Second diffusion portions 23, 23, . . . are formed on the upper surface side between the outer edge part 15 and the reflection parts 14, 14, . . . excluding the innermost reflection part 14, respectively. The second diffusion portions 23, 23, . . . are formed at least partially in regions facing the first diffusion portions 22, 22, . . . . The second diffusion portion 23 is, for example, a plurality of cylindrical steps arranged side by side in the left and right direction. Here, similar to the first diffusion portion 22, the second diffusion portion 23 is not limited to the cylindrical steps, but may be a convex-concave shape or the like formed by embossing or knurling.

Partition portions 24, 24, are provided between the reflection parts 14, 14, . . . and on the side of the innermost reflection part 14, respectively. The partition portion 24 is formed in a shape protruding forward and obliquely upward from one side edge of the reflection part 14. The partition portion 24 is formed so that its protruding amount from the reflection part 14 is decreased toward the front.

Third diffusion portions 25, 25, . . . are formed at parts of one side surface of the partition portions 24, 24, . . ., respectively. The third diffusion portion 25 is, for example, a plurality of cylindrical steps arranged side by side in the upper and lower direction. Here, similar to the first diffusion portion 22 and the second diffusion portion 23, the third diffusion portion 25 is not limited to the cylindrical steps, but may be a convex-concave shape or the like formed by embossing or knurling.

The first substrate 8 has a laterally long shape oriented in the upper and lower direction (see FIG. 4).

Protrusion insertion holes 8a, 8a, . . . are formed in the first substrate 8 so as to be separated from each other in the left and right direction. Pin insertion holes 8b, 8b are formed in the first substrate 8 so as to be separated from each other in the left and right direction. A lower surface of the first substrate 8 is formed as an element mounting surface 8c. First light emitting elements 26, 26, . . . are mounted on the element mounting surface Sc so as to be separated from each other in the left and right direction. For example, a light emitting diode (LED) is used as the first light emitting element 26. The element mounting surface Sc is colored in dark color, for example, black. Here, the coloring of the element mounting surface Sc is not limited to black. The element mounting surface Sc may be colored in other dark color such as green or dark blue and only the portions around the first light emitting elements 26, 26, . . . may be colored.

First heat transfer sheets 27, 27, . . . are adhered on the upper surface of the first substrate 8 so as to be separated from each other in the left and right direction. The first heat transfer sheets 27, 27, . . . are adhered to positions directly above the first light emitting elements 26, 26, . . ., respectively.

Figure 5:
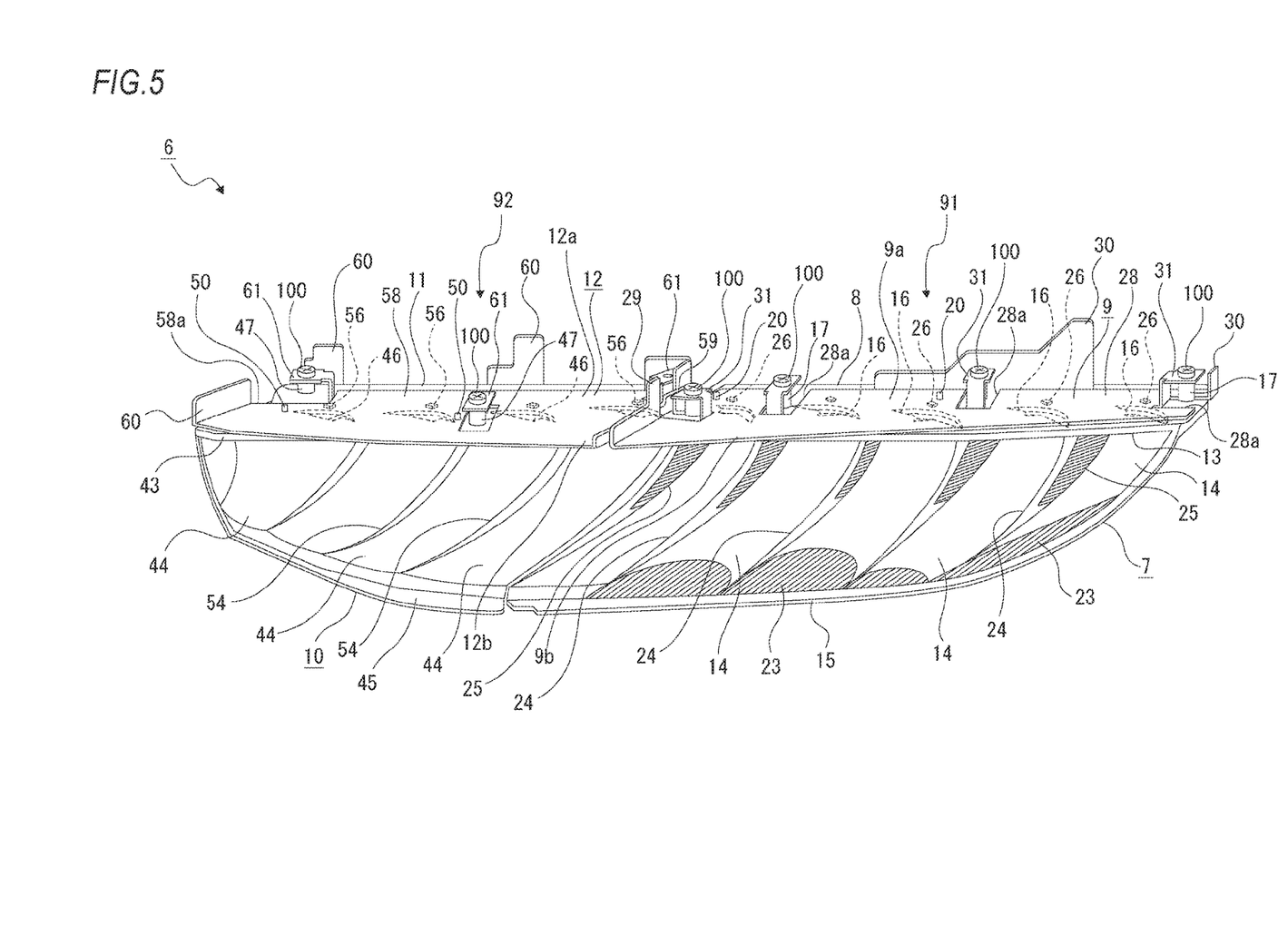
FIG. 5 is a perspective view of the vehicle lamp.

The first substrate 8 is placed on the base part 13 by respectively inserting the positioning pins 20, 20 provided on the base part 13 through the pin insertion holes 8b, 8b and is positioned in the horizontal direction, i.e., a direction perpendicular to the thickness direction with respect to the first reflector 7 (see FIGS. 4 and 5). When the first substrate 8 is placed on the base part 13, the second positioning portions 19, 19, . . . of the positioning protrusions 17, 17, . . . of the base part 13 are respectively inserted through the protrusion insertion holes 8a, 8a, . . ., and a lower surface of the first substrate 8 is placed on the first positioning portions 18, 18, . . . (see FIGS. 5 and 7). In this manner, the first substrate 8 is positioned in the vertical direction (thickness direction) with respect to the first reflector 7 by the first positioning portions 18, 18, . . . .

In a state where the first substrate 8 is disposed on the base part 13, both front and rear edges of the first substrate 8 are aligned with both front and rear edges of the base part 13, respectively (see FIG. 2). At this time, the first light emitting elements 26, 26, . . . mounted on the element mounting surface 8c of the first substrate 8 are positioned in the light transmitting holes 16, 16, . . . of the base part 13, respectively As described above, since the first substrate 8 is disposed on the base part 13 and both front and rear edges of the first substrate 8 are respectively aligned with both front and rear edges of the base part 13 in a state where the first substrate 8 is disposed on the base part 13, the base part 13 has a function of holding the first substrate 8 and also functions as a concealing part for concealing the first substrate 8 from below.

The first heat-dissipation plate 9 is made of a metal material such as aluminum, for example, and has a laterally long shape as a whole (see FIG. 4). The first heat-dissipation plate 9 has an attached surface portion 28 oriented in the upper and lower direction, a standing wall surface portion 29 formed by bending one side edge of the attached surface portion 28 upward, reinforcing surface portions 30, 30 formed by bending a part of a peripheral edge of the attached surface portion 28 upward or downward, and coupling piece portions 31, 31, . . . formed by cutting and raising the attached surface portion 28.

The first heat-dissipation plate 9 has a function of dissipating heat generated when the first light emitting elements 26, 26, . . . are turned on, and the standing wall surface portion 29 and the reinforcing surface portions 30, 30, . . . formed by bending the attached surface portion 28 are provided on the first heat-dissipation plate 9. In this way, the heat-dissipation area is increased to improve the heat-dissipation performance. Although heat is respectively released from each surface of the first heat-dissipation plate 9, its upper surface is the surface with the greatest amount of heat generation and is configured as a discharge surface 9a. Further, since the standing wall surface portion 29 and the reinforcing surface portions 30, 30, . . . are provided, the standing wall surface portion 29 and the reinforcing surface portions 30, 30, . . . also function as reinforcing ribs, and the strength of the first heat-dissipation plate 9 is improved.

Since the coupling piece portions 31, 31, . . . are formed by cutting and raising the attached surface portion 28 as described above, a space is formed in each cut and raised portion of the attached surface portion 28, and these spaces are formed as protrusion insertion holes 28a, 28a, . . . . The protrusion insertion hole 28a, 28a, . . . are formed so as to be separated from each other in the left and right direction. Pin insertion holes 28b, 28b are formed in the attached surface portion 28 so as to be separated from each other in the left and right direction.

The coupling piece portion 31 has a connecting portion 32 protruding upward from a part of an opening edge of the protrusion insertion hole 28a, and a coupling surface portion 33 protruding in the horizontal direction from an upper end edge of the connecting portion 32. A screw insertion hole 33a is formed in the coupling surface portion 33.

The first heat-dissipation plate 9 is placed on the first heat transfer sheets 27, 27, . . . adhered to the first substrate 8 by respectively inserting the positioning pins 20, 20 provided on the base part 13 through the pin insertion holes 28b, 28b and is positioned in the horizontal direction, i.e., a direction perpendicular to the thickness direction with respect to the first reflector 7. When the first heat-dissipation plate 9 is placed on the first heat transfer sheets 27, 27, . . . , the second positioning portions 19, 19, . . . of the positioning protrusions 17, 17, of the base part 13 are respectively inserted through the protrusion insertion holes 28a, 28a, . . . , and the coupling surface portions 33, 33, . . . of the coupling piece portions 31, 31, . . . are respectively placed on upper surfaces of the second positioning portions 19, 19, (see FIGS. 5 and 7). In a state where the coupling surface portions 33, 33, . . . are respectively placed on the upper surfaces of the second positioning portions 19, 19, . . . , mounting screws 100, 100, . . . respectively inserted through the screw insertion holes 33a, 33a, . . . of the coupling surface portions 33, 33, . . . are screwed into the screw holes 19a, 19a, . . . , so that the first heat-dissipation plate 9 is coupled to the first reflector 7.

Further, the first substrate 8 is attached to the first reflector 7 by being sandwiched between the base part 13 and the attached surface portion 28 of the first heat-dissipation plate 9 via the first heat transfer sheets 27, 27, . . . .

When the coupling surface portions 33, 33, . . . are respectively placed on the upper surfaces of the second positioning portions 19, 19, . . . , the first heat-dissipation plate 9 is positioned in the vertical direction (thickness direction) with respect to the first reflector 7. At this time, the attached surface portions 28 is pressed against the first heat transfer sheets 27, 27, . . . at a predetermined contact pressure, so that a good contact state of the first heat-dissipation plate 9 to the first heat transfer sheets 27, 27, . . . is secured.

As described above, in the vehicle lamp 1, the positioning protrusion 17 that includes the first positioning portion 18 for positioning the first substrate 8 in the thickness direction and the second positioning portion 19 for positioning the first heat-dissipation plate 9 in the thickness direction is provided on the base part 13.

Therefore, since the first substrate 8 is positioned in the thickness direction and the first heat-dissipation plate 9 is positioned in the thickness direction by, respectively, the first positioning portion 18 and the second positioning portion 19 provided in the positioning protrusion 17, a high positional accuracy of the first heat-dissipation plate 9 to the first substrate 8 is secured and a good contact state of the first heat-dissipation plate 9 and the first substrate 8 to the first heat transfer sheets 27, 27, . . . is secured, thereby improving the heat-dissipation performance.

Further, the coupling piece portion 31 coupled to the second positioning portion 19 is provided in the first heat-dissipation plate 9. The coupling piece portion 31 is formed by bending a part of the first heat-dissipation plate 9.

Therefore, the coupling piece portion 31 formed by bending a part of the first heat-dissipation plate 9 is coupled to the second positioning portion 19, and the first heat-dissipation plate 9 is positioned with respect to the base part 13. In this manner, it is possible to easily form the portion for positioning the first heat-dissipation plate 9 with respect to the base part 13.

Furthermore, the first heat-dissipation plate 9 is coupled to the second positioning portion 19 by screwing, and the first substrate 8 is held on the base part 13 by being pressed by the first heat-dissipation plate 9 coupled to the second positioning protrusion 19.

Therefore, since the first substrate 8 is held on the base part 13 by screwing the first heat-dissipation plate 9 into the second positioning protrusion 19, it is unnecessary to perform an operation of coupling both of the first heat-dissipation plate 9 and the first substrate 8 to the base part 13, so that the workability in the coupling operation can be improved.

Furthermore, since the first heat transfer sheets 27, 27, . . . are in contact with the surface of the first substrate 8 opposite to the element mounting surface 8c, and the first heat-dissipation plate 9 is not disposed so as to face the first light emitting elements 26, 26, . . . , the first heat-dissipation plate 9 and the first light emitting elements 26, 26, . . . do not interfere with each other, and thus, it is unnecessary to form a hole for avoiding interference in the first heat-dissipation plate 9. In this manner, the heat-dissipation area of the first heat-dissipation plate 9 can be increased to improve the heat-dissipation performance.

In a state where the first heat-dissipation plate 9 is attached to the first reflector 7, a front end portion of the first heat-dissipation plate 9 is positioned on the front side of a front end of the base part 13 and a front end of the first substrate 8 (see FIGS. 2 and 5). Therefore, the portion of the first heat-dissipation plate 9 positioned on the front side of the front end of the base part 13 and the front end of the first substrate 8 is provided as a protruding portion 9b.

The second reflector 10 is positioned on the inside of the vehicle with respect to the first reflector 7, and respective parts thereof are integrally formed (see FIGS. 1 and 4). The second reflector 10 is positioned adjacent to the first reflector 7 and includes a base part 43 formed in a plate shape and oriented in the upper and lower direction, reflection parts 44, 44, . . . configured to reflect light, and an outer edge part 45, one end portion of which is continuous to one end portion of the base part 43.

The base part 43 has a laterally long shape. Light transmitting holes 46, 46, . . . are formed at a rear end portion of the base part 43 so as to be separated from each other in the left and right direction (see FIGS. 4 and 6). The light transmitting hole 46 has a laterally long shape, and an opening edge thereof has a front opening edge 46*a* formed in a substantially linear shape and a rear opening edge 46*b* formed in a gently curved shape convex backward. In the light transmitting hole 46, both left and right ends of the front opening edge 46*a* are aligned with both left and right ends of the rear opening edge 46*b*, respectively.

Positioning protrusions 47, 47, . . . protruding upward are provided on the base part 43 (see FIGS. 4 and 7). The positioning protrusion 47 has a first positioning portion 48 having a large diameter and a second positioning portion 49 having a small diameter. The first positioning portion 48 has a flange shape protruding outward from a lower end portion of the second positioning portion 49, and the second positioning portion 49 has a round shaft shape extending in the upper and lower direction. A screw hole 49*a* opening upward is formed in the second positioning portion 49.

Positioning pins 50, 50 protruding upward are provided on the base part 43 so as to be separated from each other in the left and right direction.

Substantially V-shaped notches 51, 51, opening rearward are formed in the base part 43 (see FIG. 8). The notch 51 is formed continuously with the front opening edge 46*a* of the light transmitting hole 46 and is continuous with the center portion of the front opening edge 46*a* in the left and right direction.

On the lower surface of the base part 43, first diffusion portions 52, 52, . . . are formed side by side in the left and right direction. The first diffusion portions 52, 52, . . . are formed at least partially in regions facing the reflection parts 44, 44, . . . . The first diffusion portion 52 is, for example, a plurality of cylindrical steps arranged side by side in the left and right direction. Here, the first diffusion portion 52 is not limited to the cylindrical steps, but may be a convex-concave shape or the like formed by embossing or knurling.

The reflection parts 44, 44, . . . are positioned side by side in the left and right direction and provided continuously with the rear opening edges 46*b*, 46*b*, . . . of the light transmitting holes 46, 46, . . . , respectively (see FIGS. 3 and 4). The reflection part 44 has an upper edge aligned with the rear opening edge 46*b* and is inclined so as to be displaced forward as going downward.

The outer edge part 45 is provided to extend from the front position of the reflection parts 44, 44, . . . toward the inner end edge of the base part 43, and has a strip-like shape having a small width in the front and rear direction.

Partition portions 54, 54, . . . are provided between the reflection parts 44, 44, . . . , respectively. The partition portion 54 is formed in a shape protruding forward and obliquely upward from one side edge of the reflection part 44. The partition portion 54 is formed so that its protruding amount from the reflection part 54 is decreased toward the front.

The second substrate 11 has a laterally long shape oriented in the upper and lower direction (see FIG. 4).

Protrusion insertion holes 11*a*, 11*a*, . . . are formed in the second substrate 11 so as to be separated from each other in the left and right direction. Pin insertion holes 11*b*, 11*b* are formed in the second substrate 11 so as to be separated from each other in the left and right direction. A lower surface of the second substrate 11 is formed as an element mounting surface 11*c*. Second light emitting elements 56, 56, . . . are mounted on the element mounting surface 11*c* so as to be separated from each other in the left and right direction. For example, a light emitting diode (LED) is used as the second light emitting element 56. The element mounting surface 11*c* is colored in dark color, for example, black. Here, the coloring of the element mounting surface 11 is not limited to black. The element mounting surface 11*c* may be colored in other dark color such as green or dark blue and only the portions around the second light emitting elements 56, 56, . . . may be colored.

Second heat transfer sheets 57, 57, . . . are adhered on the upper surface of the second substrate 11 so as to be separated from each other in the left and right direction. The second heat transfer sheets 57, 57, . . . are adhered to positions directly above the second light emitting elements 56, 56, . . . , respectively.

The second substrate 11 is placed on the base part 43 by respectively inserting the positioning pins 50, 50 provided on the base part 43 through the pin insertion holes 11*b*. 11*b* and is positioned in the horizontal direction, i.e., a direction perpendicular to the thickness direction with respect to the second reflector 10 (see FIGS. 4 and 5). When the second substrate 11 is placed on the base part 43, the second positioning portions 49, 49, . . . of the positioning protrusions 47, 47, . . . of the base part 43 are respectively inserted through the protrusion insertion holes 11*a*, 11*a*, . . . , and a lower surface of the second substrate 11 is placed on the first positioning portions 48, 48, . . . (see FIGS. 5 and 7). In this manner, the second substrate 11 is positioned in the vertical direction (thickness direction) with respect to the second reflector 11 by the first positioning portions 48, 48, . . . .

In a state where the second substrate 11 is disposed on the base part 43, both front and rear edges of the second substrate 11 are aligned with both front and rear edges of the base part 43, respectively (see FIG. 3). At this time, the second light emitting elements 56, 56, . . . mounted on the element mounting surface 11*c* of the second substrate 11 are positioned in the light transmitting holes 46, 46, . . . of the base part 43, respectively.

As described above, since the second substrate 11 is disposed on the base part 43 and both front and rear edges of the second substrate 11 are respectively aligned with both front and rear edges of the base part 43 in a state where the second substrate 11 is disposed on the base part 43, the base part 43 has a function of holding the second substrate 11 and also functions as a concealing part for concealing the second substrate 11 from below.

The second heat-dissipation plate 12 is made of a metal material such as aluminum, for example, and has a laterally long shape as a whole (see FIG. 4). The second heat-dissipation plate 12 has an attached surface portion 58 oriented in the upper and lower direction, a standing wall surface portion 59 formed by bending one side edge of the attached surface portion 58 upward, reinforcing surface portions 60, 60 formed by bending a part of a peripheral edge of the attached surface portion 58 upward or downward, and coupling piece portions 61, 61, . . . formed by cutting and raising the attached surface portion 58. Although heat is respectively released from each surface of the second heat-dissipation plate 12, its upper surface is the surface with the greatest amount of heat generation and is configured as a discharge surface 12*a*.

The second heat-dissipation plate 12 has a function of dissipating heat generated when the second light emitting elements 56, 56, . . . are turned on, and the standing wall surface portion 59 and the reinforcing surface portions 60, 60, . . . formed by bending the attached surface portion 58 are provided on the second heat-dissipation plate 12. In this way, the heat-dissipation area is increased to improve the heat-dissipation performance. Further, since the standing wall surface portion 59 and the reinforcing surface portions 60, 60, . . . are provided, the standing wall surface portion 59 and the reinforcing surface portions 60, 60, . . . also function as reinforcing ribs, and the strength of the second heat-dissipation plate 9 is improved.

Since the coupling piece portions 61, 61, . . . are formed by cutting and raising the attached surface portion 58 as described above, a space is formed in each cut and raised portion of the attached surface portion 58, and these spaces are formed as protrusion insertion holes 58a, 58a, . . . . The protrusion insertion hole 58a, 58a, . . . are formed so as to be separated from each other in the left and right direction. Pin insertion holes 58b, 58b are formed in the attached surface portion 58 so as to be separated from each other in the left and right direction.

The coupling piece portion 61 has a connecting portion 62 protruding upward from a part of an opening edge of the protrusion insertion hole 58a, and a coupling surface portion 63 protruding in the horizontal direction from an upper end edge of the connecting portion 62. A screw insertion hole 63a is formed in the coupling surface portion 63.

The second heat-dissipation plate 12 is placed on the second heat transfer sheets 57, 57, . . . adhered to the second substrate 11 by respectively inserting the positioning pins 50, 50 provided on the base part 43 through the pin insertion holes 58b, 58b and is positioned in the horizontal direction, i.e., a direction perpendicular to the thickness direction with respect to the second reflector 10. When the second heat-dissipation plate 12 is placed on the second heat transfer sheet 57, 57, . . . , the second positioning portions 49, 49, . . . of the positioning protrusions 47, 47, . . . of the base part 43 are respectively inserted through the protrusion insertion holes 58a, 58a, . . . , and the coupling surface portions 63, 63, . . . of the coupling piece portions 61, 61, . . . are respectively placed on upper surfaces of the second positioning portions 49, 49, . . . (see FIGS. 5 and 7). In a state where the coupling surface portions 63, 63, . . . are respectively placed on the upper surfaces of the second positioning portions 49, 49, . . . , mounting screws 100, 100, . . . respectively inserted through the screw insertion holes 63a, 63a, . . . of the coupling surface portions 63, 63, . . . are screwed into the screw holes 49a, 49a, . . . , so that the second heat-dissipation plate 12 is coupled to the second reflector 10. Further, the second substrate 11 is attached to the second reflector 10 by being sandwiched between the base part 43 and the attached surface portion 58 of the second heat-dissipation plate 12 via the second heat transfer sheets 57, 57, . . . .

When the coupling surface portions 63, 63, . . . are respectively placed on the upper surfaces of the second positioning portions 49, 49, . . . , the second heat-dissipation plate 12 is positioned in the vertical direction (thickness direction) with respect to the second reflector 10. At this time, the attached surface portions 58 is pressed against the second heat transfer sheets 57, 57, . . . at a predetermined contact pressure, so that a good contact state of the second heat-dissipation plate 12 to the second heat transfer sheets 57, 57, . . . is secured.

As described above, in the vehicle lamp 1, the positioning protrusion 47 that includes the first positioning portion 48 for positioning the second substrate 11 in the thickness direction and the second positioning portion 49 for positioning the second heat-dissipation plate 12 in the thickness direction is provided on the base part 43.

Therefore, since the second substrate 11 is positioned in the thickness direction and the second heat-dissipation plate 12 is positioned in the thickness direction by, respectively, the first positioning portion 48 and the second positioning portion 49 provided in the positioning protrusion 47, a high positional accuracy of the second heat-dissipation plate 12 to the second substrate 11 is secured and a good contact state of the second heat-dissipation plate 12 and the second substrate 11 to the second heat transfer sheets 57, 57, . . . is secured, thereby improving the heat-dissipation performance.

Further, the coupling piece portion 61 coupled to the second positioning portion 49 is provided in the second heat-dissipation plate 12. The coupling piece portion 61 is formed by bending a part of the second heat-dissipation plate 12.

Therefore, the coupling piece portion 61 formed by bending a part of the second heat-dissipation plate 12 is coupled to the second positioning portion 49, and the second heat-dissipation plate 12 is positioned with respect to the base part 43. In this manner, it is possible to easily form the portion for positioning the second heat-dissipation plate 12 with respect to the base part 43.

Furthermore, the second heat-dissipation plate 12 is coupled to the second positioning portion 49 by screwing, and the second substrate 11 is held on the base part 43 by being pressed by the second heat-dissipation plate 12 coupled to the second positioning protrusion 49.

Therefore, since the second substrate 11 is held on the base part 43 by screwing the second heat-dissipation plate 12 into the second positioning protrusion 49, it is unnecessary to perform an operation of coupling both of the second heat-dissipation plate 12 and the second substrate 11 to the base part 43, so that the workability in the coupling operation can be improved.

Furthermore since the second heat transfer sheets 57, 57, . . . are in contact with the surface of the second substrate 11 opposite to the element mounting surface 11c, and the second heat-dissipation plate 12 is not disposed so as to face the second light emitting elements 56, 56, . . . , the second heat-dissipation plate 12 and the second light emitting elements 56, 56, . . . do not interfere with each other, and thus, it is unnecessary to form a hole for avoiding interference in the second heat-dissipation plate 12. In this manner, the heat-dissipation area of the second heat-dissipation plate 12 can be increased to improve the heat-dissipation performance.

In a state where the second heat-dissipation plate 12 is attached to the second reflector 10, a front end portion of the second heat-dissipation plate 12 is positioned on the front side of a front end of the base part 43 and a front end of the second substrate 11 (see FIGS. 3 and 5). Therefore, the portion of the second heat-dissipation plate 12 positioned on the front side of the front end of the base part 43 and the front end of the second substrate 11 is provided as a protruding portion 12b.

The first reflector 7 and the second reflector 10 configured as described above are attached to a bracket (not shown) and positioned adjacent to each other. In a state where the first reflector 7 and the second reflector 10 are attached to the bracket, the standing wall surface portion 29 of the first heat-dissipation plate 9 and the standing wall surface portion 59 of the second heat-dissipation plate 12 are positioned so as to be separated from each other while facing each other (FIGS. 4 and 5).

An extension (not shown) is disposed at a predetermined position in the lamp chamber 5. A part of the structures disposed in the lamp chamber 5 is shielded by the extension.

In the lamp unit 6 configured as described above, when light is emitted from the first light emitting elements 26, 26, . . . mounted on the first substrate 8, a low beam is irradiated forward by the emitted light.

Light emitted from the first light emitting elements 26, 26, . . . is transmitted through the light transmitting holes 16, 16, . . . and the notches 21a, 21a, . . . of the base part 13, and reflected forward by the reflection parts 14, 14, . . . . Then, the light is transmitted through the cover 3 and is irradiated. At this time, the light which is emitted from the first light emitting element 26 and directed upward, is shielded by the light-shielding portion 21 provided on the base part 13. In this manner, the light-shielding portion 21 functions as a shade for forming a low beam.

Since the light-shielding portion 21 for shielding a part of light emitted from the first light emitting element 26 toward the reflection part 14 is provided on the base part 13 in this manner, a part of light emitted downward from the first light emitting element 26 toward the reflection part 14 is shielded by the light-shielding portion 21 and a desired light distribution pattern can be formed by the light emitted from the first light emitting element 26. In particular, since the light-shielding portion 21 is provided between the first light emitting element 26 and the first diffusion portion 22, a part of light emitted forward from the first light emitting element 26 is shielded by the light-shielding portion 21, and light, which is transmitted through the light transmitting hole 16 but does not contribute to the formation of the light distribution pattern, is diffused by the first diffusion portion 22. In this manner, it is possible to form a desired light distribution pattern while suppressing the occurrence of dazzling light.

When light is emitted from the first light emitting elements 26, 26, . . . , the light may reach the portions other than the reflection parts 14, 14, . . . of the first reflector 7. However, in this case, the light directed to the portions other than the reflection parts 14, 14, . . . is diffused by the first diffusion portions 22, 22, . . . , the second diffusion portions 23, 23, . . . , or the third diffusion portions 25, 25, . . . . Further, light such as stray light which does not contribute to the formation of a light distribution pattern may be generated in the light which is emitted from the first light emitting elements 26, 26, . . . and reflected by the reflection parts 14, 14, . . . . However, in this case, at least a part of such light is diffused by the first diffusion portions 22, 22, . . . , the second diffusion portions 23, 23, . . . , or the third diffusion portions 25, 25, . . . .

Therefore, when the first light emitting elements 26, 26, . . . are turned on, unnecessary reflection of light other than the light forming a low beam light distribution pattern is prevented, so that it is possible to suppress the occurrence of dazzling light to a passenger of an oncoming vehicle or a preceding vehicle.

In particular, since the first diffusion portions 22, 22, . . . are formed in the base part 13 which holds the first substrate 8 and also functions as a concealing part for concealing the first substrate 8, a dedicated component for forming the first diffusion portions 22, 22, . . . is not required. Therefore, it is possible to suppress the occurrence of dazzling light while reducing the number of parts and saving the manufacturing cost.

Although heat is generated when the first light emitting elements 26, 26, . . . are turned on, the generated heat is transferred from the first substrate 8 to the first heat-dissipation plate 9 via the first heat transfer sheets 27, 27, . . . , and is discharged from the first heat-dissipation plate 9.

At this time, as described above, since the first substrate 8 and the first heat-dissipation plate 9 are positioned in the thickness direction by the positioning protrusion 17 and a good contact sate of the first heat-dissipation plate 9 to the first heat transfer sheets 27, 27, . . . is secured, a good heat transfer performance from the first substrate 8 to the first heat-dissipation plate 9 via the first heat transfer sheets 27, 27, . . . is secured, and the improvement in the heat-dissipation performance by the first heat-dissipation plate 9 can be achieved.

Further, when the first light emitting elements 26, 26, . . . are turned off, the color (dark color) of the element mounting surface 8c of the first substrate 8 is projected on the reflection parts 14, 14, . . . . At this time, when sunlight is incident, the sunlight is diffused by the first diffusion portions 22, 22, . . . , the second diffusion portions 23, 23, . . . , or the third diffusion portions 25, 25, . . . .

Therefore, each part of the first reflector 7 does not appear to shine when the vehicle lamp 1 is visually recognized from the outside, so that it is possible to suppress the occurrence of dazzling light to a passenger of other vehicle or a pedestrian or the like.

On the other hand, in the lamp unit 6, when light is emitted from the first light emitting elements 26, 26, . . . mounted on the first substrate 8 and the second light emitting elements 56, 56, . . . mounted on the second substrate 11, a high beam is irradiated forward by the emitted light.

Light emitted from the second light emitting elements 56, 56, . . . is respectively transmitted through the light transmitting holes 46, 46, . . . and the notches 51, 51, . . . of the base part 43 and reflected forward by the reflection parts 44, 44, . . . . Then, the light is transmitted through the cover 3 and is irradiated.

When light is emitted from the first light emitting elements 26, 26, . . . and the second light emitting elements 56, 56, . . . , the light may reach the portions other than the reflection parts 14, 14, . . . of the first reflector 7 and the reflection parts 44, 44, . . . of the second reflector 10. However, in this case, the light directed to the portions other than the reflection parts 14, 14, . . . and the reflection parts 44, 44, . . . is diffused by the first diffusion portions 22, 22, . . . and the first diffusion lights 52, 52, . . . , the second diffusion portions 23, 23, . . . , or the third diffusion portions 25, 25, . . . . Further, light such as stray light which does not contribute to the formation of a light distribution pattern may be generated in the light which is emitted from the first light emitting elements 26, 26, . . . and the second light emitting elements 56, 56, . . . and reflected by the reflection parts 14, 14, . . . and the reflection parts 44, 44, . . . . However, in this case, at least a part of such light is also diffused by the first diffusion portions 22, 22, . . . and the first diffusion portions 52, 52, . . . , the second diffusion portions 23, 23, . . . , or the third diffusion portions 25, 25, Therefore, when the first light emitting elements 26, 26, . . . and the second light emitting elements 56, 56, . . . are turned on, unnecessary reflection of light other than the light forming a high beam light distribution pattern is prevented, so that it is possible to suppress the occurrence of dazzling light to a passenger of an oncoming vehicle or a preceding vehicle.

In particular, since the first diffusion portions 52, 52, . . . are formed in the base part 43 which holds the second substrate 11 and also functions as a concealing part for concealing the second substrate 11, a dedicated component for forming the first diffusion portions 52, 52, . . . is not required. Therefore, it is possible to suppress the occurrence of dazzling light while reducing the number of parts and saving the manufacturing cost.

Although heat is generated when the second light emitting elements 56, 56, . . . are turned on, the generated heat is transferred from the second substrate 11 to the second heat-dissipation plate 12 via the second heat transfer sheets 57, 57, . . . , and is discharged from the second heat-dissipation plate 12.

At this time, as described above, since the second substrate 11 and the second heat-dissipation plate 12 are positioned in the thickness direction by the positioning protrusion 47 and a good contact sate of the second heat-dissipation plate 12 to the second heat transfer sheets 57, 57, . . . is secured, a good heat transfer performance from the second substrate 11 to the second heat-dissipation plate 12 via the second heat transfer sheets 57, 57, . . . is secured, and the improvement in the heat-dissipation performance by the second heat-dissipation plate 12 can be achieved.

Further, when the first light emitting elements 26, 26, . . . and the second light emitting elements 56, 56, . . . are turned off, the colors (dark color) of the element mounting surface 8*c* of the first substrate 8 and the element mounting surface 11*c* of the second substrate 11 are projected on the reflection parts 14, 14, . . . and the reflection parts 44, 44, . . . , respectively. At this time, when sunlight is incident, the sunlight is diffused by the first diffusion portions 22, 22, . . . and the first diffusion portions 52, 52, . . . , the second diffusion portions 23, 23, . . . , or the third diffusion portions 25, 25, . . . .

Therefore, each part of the first reflector 7 and the second reflector 10 does not appear to shine when the vehicle lamp 1 is visually recognized from the outside, so that it is possible to suppress the occurrence of dazzling light to a passenger of other vehicle or a pedestrian or the like.

As described above, in the vehicle lamp 1, at the time of the turning on, a part of light is diffused. At the time of the turning off, the dark color of the first substrate 8 and the second substrate 11 is projected on the reflection parts 14, 14, . . . and the reflection parts 44, 44, . . . , and sunlight is diffused when sunlight is incident. Therefore, it is possible to suppress the occurrence of dazzling light at the time of the turning on and off.

Further, in the vehicle lamp 1, when the first light emitting element 26 is turned on and off, light is diffused by not only the first diffusion portion 22 but also the second diffusion portion 23 and the third diffusion portion 25. Therefore, it is possible to sufficiently suppress the occurrence of dazzling light.

As described above, in the vehicle lamp 1, high heat-dissipation from the first heat-dissipation plate 9 and the second heat-dissipation plate 12 is secured, so that the temperature rise of the first substrate 9 and the second substrate 12 is sufficiently suppressed and a good light state of the first light emitting elements 26, 26, . . . and the second light emitting elements 56, 56, . . . is secured.

The protruding portion 9*b* of the first heat-dissipation plate 9 is positioned on the front side of the front end of the base part 13 and the front end of the first substrate 8, and the protruding portion 12*b* of the second heat-dissipation plate 12 is positioned on the front side of the front end of the base part 43 and the front end of the second substrate 11. That is, the protruding portion 12*b* is positioned on the travelling direction side of the light reflected by the reflection part 14 or the reflection part 44.

Since the protruding portion 9*b* is positioned on the front side of the front end of the base part 13 and the front end of the first substrate 8, and the protruding portion 12*b* is positioned on the front side of the front end of the base part 43 and the front end of the second substrate 11 in this manner, it is possible to improve the concealing property of preventing a part of the internal structure, which is disposed above the first heat-dissipation plate 9 and the second heat-dissipation plate 12 in the lamp outer casing 4, from being seen from the outside.

Further, since the protruding portion 9*b* is provided in the first heat-dissipation plate 9 and the protruding portion 12*b* is provided in the second heat-dissipation plate 12, the heat-dissipation areas of the first heat-dissipation plate 9 and the second heat-dissipation plate 12 are increased to further improve the heat-dissipation performance.

Therefore, since the heat-dissipation areas of the first heat-dissipation plate 9 and the second heat-dissipation plate 12 are increased by the protruding portions 9*b*, 12*b* and a part of the internal structure disposed inside the lamp outer casing 4 is shielded, it is possible to improve the heat-dissipation for heat generated when the first light emitting elements 26, 26, . . . and the second light emitting elements 56, 56, . . . are turned on and to sufficiently conceal a part of the internal structure without increasing the manufacturing cost.

Further, since the standing wall surface portion 29 of the first heat-dissipation plate 9 and the standing wall surface portion 59 of the second heat-dissipation plate 12 are positioned to be separated in a state of facing each other, a space is formed between the standing wall surface portions 29, 59, and this space serves as a heat-dissipation space of the heat discharged from the first heat-dissipation plate 9 and the second heat-dissipation plate 12. In this manner, the heat-dissipation property can be improved.

Meanwhile, in the vehicle lamp 1, the upper surfaces of the first heat-dissipation plate 9 and the second heat-dissipation plate 12 may be colored in a dark color. When the upper surfaces of the first heat-dissipation plate 9 and the second heat-dissipation plate 12 are colored in a dark color, the effective heat-dissipation can be achieved by upward heat radiation and convection. Further, light is absorbed by the first heat-dissipation plate 9 and the second heat-dissipation plate 12, so that the light-shielding property of sunlight can be increased.

Further, in the vehicle lamp 1, a plurality of reflection parts 14, 14, . . . and a plurality of reflection parts 44, 44, . . . are provided, the reflection parts 14, 14, . . . and the reflection parts 44, 44, . . . are respectively arranged with respect to the first light emitting elements 26, 26, . . . and the second light emitting elements 56, 56, . . . , and the reflection parts 14, 14, . . . and the reflection parts 44, 44, are integrally formed, respectively.

Therefore, light emitted from the first light emitting elements 26, 26, . . . and the second light emitting elements 56, 56, . . . is reflected in a predetermined direction by the reflection parts 14, 14, . . . and the reflection part 44, 44, . . . , respectively. In this manner, a good control state of light can be secured and the number of parts can be reduced.

Furthermore, since the base parts 13, 43 and the reflection parts 14, 14, . . . , 44, 44, . . . are integrally formed, respectively, positional accuracy between the base parts 13, 43 for respectively holding the first substrate 8 and the second substrate 11 and the reflection parts 14, 14, . . . and the reflection parts 44, 44, . . . for reflecting light is increased. In this manner, a better control state of light can be secured and the number of parts can be further reduced.

In the lamp chamber 5, a lamp unit 70 is disposed at a position on the upper front side of the lamp unit 6 (see FIGS. 2 and 3). The lamp unit 70 has a function different from that of the lamp unit 6, and functions as, for example, a turn signal lamp.

As described above, since the lamp unit 6 and the lamp unit 70 having different functions are disposed in the lamp chamber 5 of the vehicle lamp 1, it is possible to improve the functionality.

The lamp unit 70 includes a reflection mirror 71 for reflecting light and a cover member 72 for covering the reflection mirror 71 from the upper side and from the front side. The lamp unit 70 has a laterally long shape as a whole.

The reflection mirror 71 has a substrate mounting portion 71a oriented in the upper and lower direction and a light reflecting portion 71b continued to a front end portion of the substrate mounting portion 71a.

A part of an element mounting substrate 73 is disposed on an upper surface of the substrate mounting portion 71a. A front end portion of the element mounting substrate 73 protrudes forward from the substrate mounting portion 71a and is positioned above the light reflecting portion 71b.

Light emitting bodies 74, 74, . . . are mounted on a lower surface of the element mounting substrate 73 so as to be separated from each other in the left and right direction. For example, a light emitting diode is used as the light emitting body 74.

Light is emitted downward from the light emitting body 74. The emitted light is reflected by the light reflecting portion 71b, transmitted through the cover member 72 and the cover 3 and irradiated forward.

As described above, the lamp unit 70 is disposed at a position on the upper front side of the lamp unit 6 and a space is formed on the rear side of the lamp unit 70 in the lamp chamber 5.

The space on the rear side of the lamp unit 70 in the lamp chamber 5 is present above the first heat-dissipation plate 9 and the second heat-dissipation plate 12. This space serves as a convection space 80 in which the heat discharged from the first heat-dissipation plate 9 and the second heat-dissipation plate 12 is convected when the first light emitting elements 26, 26, . . . and the second light emitting elements 56, 56, . . . are turned on.

As described above, in the vehicle lamp 1, the lamp unit 70 is disposed above the lamp unit 6, and the convection space 80 in which the heat discharged from the first heat-dissipation plate 9 and the second heat-dissipation plate 12 is convected is formed on the upper side of the lamp unit 6 and on the rear side of the lamp unit 70.

Therefore, the heat is convected in the space where the lamp unit 6 and the lamp unit 70 are not disposed, so that the heat-dissipation property can be improved by effective space utilization while improving the functionality of the vehicle lamp 1 by the lamp unit 6 and the lamp unit 70.

Although the embodiments of the disclosure have been described above, it goes without saying that the technical scope of the disclosure should not be interpreted limitedly by the description of these embodiments. It will be understood by those killed in the art that these embodiments are merely examples and that various modifications can be made within the scope of the invention described in the claims. The technical scope of the disclosure should be determined on the basis of the scope of the invention described in the claims and its equivalent scope.

The present application is based on Japanese Patent Application (Patent Application No. 2015-180734) filed on Sep. 14, 2015, Japanese Patent Application (Patent Application No. 2015-180735) filed on Sep. 14, 2015, and Japanese Patent Application (Patent Application No. 2015-180736) filed on Sep. 14, 2015, the contents of which are appropriately incorporated herein.

The invention claimed is:

1. A vehicle lamp comprising:
   a light emitting element functioning as a light source;
   a substrate on which the light emitting element is mounted, at least the portion of the substrate on which the light emitting element is mounted being colored in a dark color,
   a reflection part configured to reflect light emitted from the light emitting element, and
   a concealing part configured to hold the substrate and conceal at least a part of the substrate,
   wherein a first diffusion portion configured to diffuse light is formed in at least a part of a region of the concealing part facing the reflection part, and
   wherein a second diffusion portion located continuously with the reflection part and configured to diffuse light is formed in a region facing the first diffusion portion.

2. The vehicle lamp according to claim 1,
   wherein the light emitting element has a plurality of light emitting elements,
   wherein the reflection part has a plurality of reflection parts,
   wherein each of the plurality of reflection parts is arranged to correspond to one of the plurality of light emitting elements, and
   wherein the plurality of reflection parts are integrally formed.

3. The vehicle lamp according to claim 2,
   wherein the concealing part and the plurality of reflection parts are integrally formed.

4. A vehicle lamp comprising:
   a light emitting functioning as a light source;
   a substrate on which the light emitting element is mounted, at least the portion of the substrate on which the light emitting element is mounted being colored in a dark color,
   a reflection part configured to reflect light emitted from the light emitting element, and
   a concealing part configured to hold the substrate and conceal at least a part of the substrate,
   wherein a first diffusion portion configured to diffuse light is formed in at least a part of a region of the concealing part facing the reflection part,
   wherein the first diffusion portion is positioned in front of the light emitting element, and
   wherein a light-shielding portion configured to shield a part of light emitted forward from the light emitting element is provided between the light emitting element and the first diffusion portion.

5. The vehicle lamp according to claim 4,
   wherein the light emitting element has a plurality of light emitting elements,
   wherein the reflection part has a plurality of reflection parts,
   wherein each of the plurality of reflection parts is arranged to correspond to one of the plurality of light emitting elements, and
   wherein the plurality of reflection parts are integrally formed.

6. The vehicle lamp according to claim 5, wherein the concealing part and the plurality of reflection parts are integrally formed.

7. A vehicle lamp comprising:
- a substrate having a first surface and a second surface facing in a direction opposite to the first surface,
- a light emitting element mounted on the first surface of the substrate,
- a base part facing the first surface of the substrate and configured to hold the substrate,
- a heat-dissipation plate configured to discharge heat generated from the light emitting element, and
- a heat transfer sheet in contact with the second surface of the substrate and the heat-dissipation plate,
- wherein a positioning protrusion is provided in the base part, and
- wherein the positioning protrusion has:
  - a first positioning portion configured to position the substrate in a thickness direction of the substrate, and
  - a second positioning portion configured to position the heat-dissipation plate in a thickness direction of the heat-dissipation plate.

8. The vehicle lamp according to claim 7,
wherein a coupling piece portion coupled to the second positioning portion is provided in the heat-dissipation plate, and
wherein the coupling piece portion is formed by bending a part of the heat-dissipation plate.

9. The vehicle lamp according to claim 7,
wherein the heat-dissipation plate is coupled to the positioning protrusion by screwing, and
wherein the substrate is held on the base part in a state of being pressed against the heat-dissipation plate coupled to the positioning protrusion via the heat transfer sheet.

10. The vehicle lamp according to claim 7,
wherein an insertion hole is formed in the substrate,
wherein a positioning pin is further provided on the base part, and
wherein the positioning pin is inserted through the insertion hole and configured to position the substrate with respect to the base part in a direction perpendicular to the thickness direction of the substrate.

11. The vehicle lamp according to claim 7,
wherein the light emitting element has a plurality of light emitting elements,
wherein the vehicle lamp further comprises a plurality of reflection parts, each of which is configured to reflect light emitted from a corresponding one of the plurality of light emitting elements, and
wherein the base part and the plurality of reflection parts are integrally formed.

12. A vehicle lamp comprising a lamp unit,
wherein the lamp unit comprises
- a light emitting element,
- a substrate on which the light emitting element is mounted,
- a heat-dissipation plate having a discharge surface configured to discharge heat,
- a reflection part configured to reflect light emitted from the light emitting element, and
- a base part configured to hold the substrate and the heat-dissipation plate in a state of being adjacent to or in close contact with each other, and wherein a protruding portion protruding forward of the vehicle lamp more than the base part is provided on the heat-dissipation plate.

13. The vehicle lamp according to claim 12,
wherein another lamp unit is disposed above the lamp unit,
wherein the discharge surface faces upward, and
wherein a convection space in which heat discharged from the discharge surface is convected is provided behind the another lamp unit.

14. The vehicle lamp according to claim 12,
wherein the lamp unit has a first irradiation module and a second irradiation module,
wherein the first irradiation module comprises
- a first light emitting element,
- a first substrate on which the first light emitting element is mounted,
- a first heat-dissipation plate having a discharge surface configured to discharge heat,
- a first reflection part configured to reflect light emitted from the first light emitting element, and
- a first base part configured to hold the first substrate and the first heat-dissipation plate in a state of being adjacent to or in close contact with each other, wherein the second irradiation module comprises
- a second light emitting element,
- a second substrate on which the second light emitting element is mounted,
- a second heat-dissipation plate having a discharge surface configured to discharge heat,
- a second reflection part configured to reflect light emitted from the second light emitting element, and
- a second base part configured to hold the second substrate and the second heat-dissipation plate in a state of being adjacent to or in close contact with each other, wherein the first heat-dissipation plate has a first attached surface portion attached to the first base part and a first standing wall surface portion bent with respect to the first attached surface portion,
wherein the second heat-dissipation plate has a second attached surface portion attached to the second base part and a second standing wall surface portion bent with respect to the second attached surface portion, and
wherein the first standing wall surface portion faces the second standing wall surface portion and is separated from the second standing wall surface portion.

15. The vehicle lamp according to claim 12,
wherein the discharge surface of the heat-dissipation plate is colored in a dark color.

16. The vehicle lamp according to claim 12,
wherein the light emitting element has a plurality of light emitting elements,
wherein the vehicle lamp further comprises a plurality of reflection parts each configured to reflect light emitted from a corresponding one of the plurality of light emitting elements, and
wherein the base part and the plurality of reflection parts are integrally formed.

* * * * *